(12) United States Patent
Ishizaki et al.

(10) Patent No.: US 12,121,930 B2
(45) Date of Patent: Oct. 22, 2024

(54) METHOD FOR MANUFACTURING EYEGLASS LENS

(71) Applicant: HOYA LENS THAILAND LTD., Pathumthani (TH)

(72) Inventors: Takako Ishizaki, Tokyo (JP); Shigetoshi Kono, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 17/780,715

(22) PCT Filed: Nov. 24, 2020

(86) PCT No.: PCT/JP2020/043530
§ 371 (c)(1),
(2) Date: May 27, 2022

(87) PCT Pub. No.: WO2021/131457
PCT Pub. Date: Jul. 1, 2021

(65) Prior Publication Data
US 2023/0381810 A1    Nov. 30, 2023

(30) Foreign Application Priority Data

Dec. 27, 2019   (JP) ................................ 2019-237935

(51) Int. Cl.
| | | |
|---|---|---|
| *B05D 1/18* | (2006.01) | |
| *B05D 5/06* | (2006.01) | |
| *B05D 7/00* | (2006.01) | |

(52) U.S. Cl.
CPC ................ *B05D 1/18* (2013.01); *B05D 5/06* (2013.01); *B05D 7/00* (2013.01); *B05D 2203/35* (2013.01)

(58) Field of Classification Search
CPC .............. B05D 1/18; B05D 5/06; B05D 7/00
See application file for complete search history.

(56) References Cited

U.S. PATENT DOCUMENTS

2016/0349538 A1* 12/2016 Ogaya ...................... G02C 7/12
2017/0131567 A1*  5/2017 To ............................ G02C 7/06
(Continued)

FOREIGN PATENT DOCUMENTS

| EP | 3640712 A1 | 4/2020 |
|---|---|---|
| JP | 2019174727 A | 10/2019 |

(Continued)

OTHER PUBLICATIONS

PCT/JP2020/043530, "International Preliminary Report on Patentability", Jul. 7, 2022', 6 pages.
(Continued)

*Primary Examiner* — Dah-Wei D. Yuan
*Assistant Examiner* — Kristen A Dagenais
(74) *Attorney, Agent, or Firm* — Kilpatrick Townsend & Stockton LLP

(57) ABSTRACT

Provided are a method for manufacturing an eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, the method including forming the coating film by immersing the lens substrate in a coating film liquid, pulling up the lens substrate, and drying the coating film liquid on the lens substrate while or after the coating film liquid flows under its own weight, and technology related thereto.

2 Claims, 8 Drawing Sheets

(56) References Cited

U.S. PATENT DOCUMENTS

| | | |
|---|---|---|
| 2019/0198267 A1 | 6/2019 | Zhou et al. |
| 2020/0132441 A1 | 4/2020 | Uchidani et al. |
| 2021/0373357 A1 | 12/2021 | Guillot et al. |
| 2021/0387430 A1 | 12/2021 | Toyoshima |

FOREIGN PATENT DOCUMENTS

| | | |
|---|---|---|
| JP | 2019179136 A | 10/2019 |
| WO | 2019124354 A1 | 6/2019 |
| WO | 2020079105 A1 | 4/2020 |

OTHER PUBLICATIONS

PCT/JP2020/043530, "English Translation of International Search Report", Feb. 22, 2021, 2 pages.
EP20905809.8, "Extended European Search Report", Feb. 6, 2024, 7 pages.

* cited by examiner

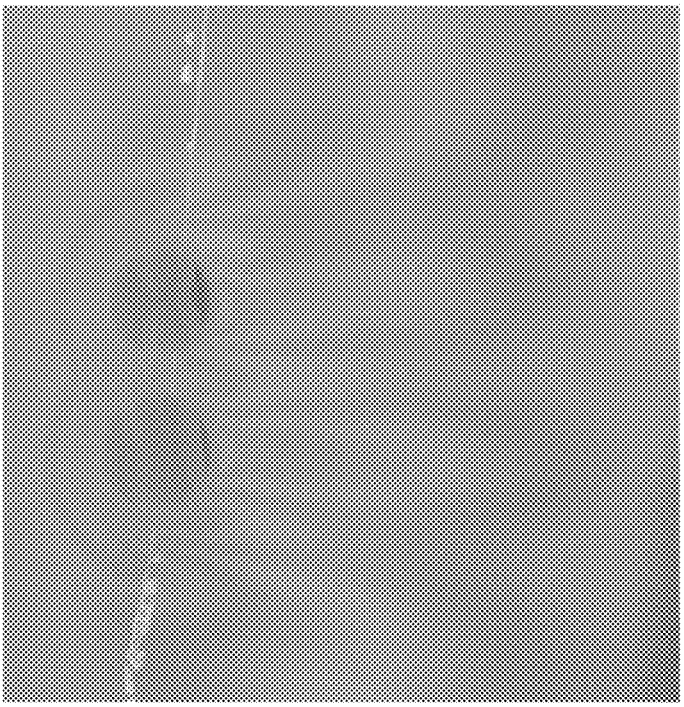
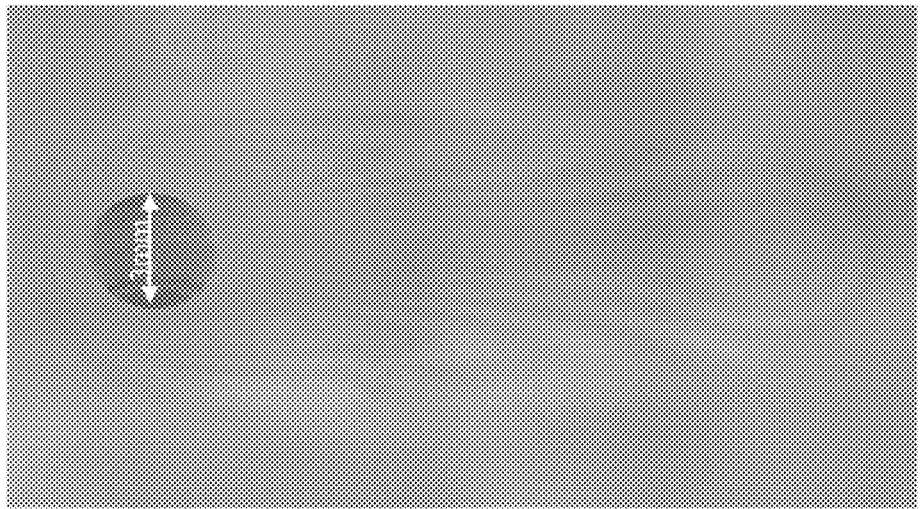
FIG. 1(a)
FIG. 1(b)

METHOD FOR MANUFACTURING EYEGLASS LENS

CROSS-REFERENCE TO RELATED APPLICATIONS

This application is the National Stage of International Application No. PCT/JP2020/043530, filed Nov. 24, 2020, which claims priority to Japanese Patent Application No. 2019-237935, filed Dec. 27, 2019, and the contents of which is incorporated by references.

TECHNICAL FIELD

The present disclosure relates to a method for manufacturing an eyeglass lens.

BACKGROUND ART

Patent Document 1 discloses an eyeglass lens for suppressing the progression of a refractive error such as near-sightedness. Specifically, for example, minute spherical convex portions (substrate protruding portions in this specification) with a diameter of about 1 mm are formed on a convex surface, which is the object-side surface of the eyeglass lens. With an eyeglass lens, normally, luminous flux that has entered from the object-side surface is emitted from the eyeball-side surface and thus is focused on the wearer's retina. On the other hand, luminous flux that has passed through the minute convex portions is focused at a position closer to the object (front side) than the wearer's retina is. As a result, the progression of near-sightedness is suppressed.

CITATION LIST

Patent Documents

Patent Document 1: US 2017/0131567A

SUMMARY OF DISCLOSURE

Technical Problem

If a coating film is formed on a surface (a convex surface, which is the object-side surface), which is provided with the minute convex portions, of the eyeglass lens disclosed in Patent Document 1, the coating film covers the surface that has the minute convex portions.

If no coating film is provided, the minute convex portions cause luminous flux to converge at a position that is closer to the object than a predetermined position A is. However, if a coating film is formed on a lens substrate, the shape of the outermost surface of the coating film (i.e., an eyeglass lens) in a surrounding region of a minute convex portion, that is, a substrate protruding portion that protrudes from a substrate base portion deviates from the shape of the vicinity of a boundary between the substrate base portion and the substrate protruding portion of the lens substrate (simply referred to as "boundary vicinity" hereinafter). It is inferred that this deviation causes luminous flux entering the boundary vicinity to become stray light.

The inventors of the present disclosure conducted intensive studies in order to resolve the above points. The inventors of the present disclosure focused on a method for forming a coating film. First, the inventors focused on a conventional spin coating method as the method for forming a coating film. If a spin coating method is adopted, the coating film in the vicinity of the boundary between the substrate base portion and the substrate protruding portion has a uniform thickness. The inventors inferred that this uniform thickness would contribute to suppressing stray light. However, with a conventional spin coating method, the generation of stray light was not suppressed.

Also, if a conventional spin coating method is used, the lens substrates are rotated while the coating film liquid is being applied to the lens substrates one-by-one, and thus productivity is poor.

An example of the present disclosure aims to provide a technique for suppressing the generation of stray light and improving productivity even when a coating film is provided so as to cover substrate protruding portions on a lens substrate that contribute to the effect of suppressing near-sightedness.

Solution to Problem

The inventors of the present disclosure conducted intensive studies in order to resolve the above issues. From a different point of view, the inventors of the present disclosure focused on, as a method for forming a coating film, a dipping method (immersion method) with which it is more difficult to control the thickness of a coating film compared to a spin coating method and the obtained coating film is likely to have a non-uniform thickness. Adopting a dipping method unexpectedly resulted in the suppression of the generation of stray light. Specifically, it was found that, on the premise that an eyeglass lens can suppress progression of near-sightedness, the generation of stray light can be suppressed by varying the thickness of the coating film over the surrounding region of each substrate protruding portion.

If an eyeglass lens can suppress the progression of near-sightedness, for example, and even if an eyeglass lens has a portion where the coating film is thick in the surrounding region of each substrate protruding portion, that is, even if an eyeglass lens has a portion whose shape largely deviates from the shape of the vicinity of the boundary between a substrate base portion and the substrate protruding portion of the lens substrate, the outermost surface of the eyeglass lens at least has convex portions and concave portions, and the effect of suppressing the progression of near-sightedness due to the substrate protruding portions is exhibited as disclosed in Patent Document 1.

With the spin coating method that the inventors of the present disclosure first focused on, portions with a large degree of deviation are evenly present over the surrounding regions of the substrate protruding portions. On the other hand, according to an aspect of the present disclosure, portions with a thin coating film are present in surrounding regions of substrate protruding portions, that is, portions whose shape has a small degree of deviation from the shape of the vicinity of the boundary between a substrate base portion and a substrate protruding portion of the lens substrate are present. The eyeglass lens obtained using the spin coating method is significantly different from an eyeglass lens obtained using a conventional spin coating method in that portions with a small degree of deviation are present.

With an aspect of the present disclosure, portions with a large degree of deviation in the shape of the coating film are present in the vicinities of the boundaries between the substrate base portion and the substrate protruding portions. However, such portions are present only in some of the vicinities thereof. Also, if a dipping method is adopted, a portion with a large degree of deviation has the equivalent degree of deviation of a portion obtained using a conventional spin coating method. Furthermore, according to an aspect of the present disclosure, portions with a small degree of deviation are present at other portions, and thus the generation of stray light is further suppressed, compared to an eyeglass lens obtained using a conventional spin coating method.

If a dipping method is adopted, when coating film liquid flows down under its own weight, variation in the thickness of the coating film occurs over surrounding regions of the substrate protruding portions, and there are portions where the coating film liquid quickly flows down and portions where the coating film liquid is likely to pool. Accordingly, there is a difference in the magnitude of the degree of deviation from the shape of the boundary vicinity over a surrounding region of a substrate protruding portion.

Furthermore, compared to a conventional spin coating method, multiple lens substrates can be processed at one time by adopting a dipping method, and thus productivity is high.

Also, it was found that, if a dipping method is adopted, the stray light ratio can be significantly reduced even when the thickness of the coating film is made uniform using a dipping method in the same manner as for the spin coating method, contrary to varying the thickness of the coating film. This example will be described near the end of [Description of Embodiments] and in the items in [Examples].

The present disclosure was made based on these findings.

A first aspect according to the present disclosure is a method for manufacturing an eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, the method including forming the coating film by immersing the lens substrate in a coating film liquid, pulling up the lens substrate, and drying the coating film liquid on the lens substrate while or after the coating film liquid flows under its own weight.

A second aspect according to the present disclosure is the aspect according to the first aspect, in which the eyeglass lens is able to suppress progression of near-sightedness.

Other aspects according to the present disclosure that can be combined with the above aspects are as follows.

If curing processing is performed through volatilization, a curing reaction of the curable compound in the coated film may be advanced by placing the lens substrate provided with the coated film made of the curable composition in an environment at an ambient temperature of 50° C. to 150° C. for about 30 minutes to 3 hours in a state where the lens substrate is inclined while the curable composition has fluidity. Note that a drying process may be performed together with this curing reaction.

The viscosity of the curable composition for forming a coating film on the surface of the lens substrate provided with the substrate protruding portions can be set as appropriate, and the curable composition preferably has a viscosity in a range from 1 to 50 mPa·s, more preferably a range from 1 to 40 mPa·s, and even more preferably a range from 1 to 20 mPa·s.

The temperature of the curable composition when the lens substrate is immersed is preferably in a range of 0° C. to 30° C.

The boiling point of a solvent that constitutes the curable composition when the lens substrate is immersed is preferably in a range of 30° C. to 200° C., and preferably in a range of 60° C. to 120° C. There is no limitation on the type of solvent, and methanol, toluene, or the like can be used, for example.

The concentration of the curable composition when the lens substrate is immersed is preferably in a range of 1 wt % to 50 wt %.

The immersion time when the lens substrate is immersed is preferably in a range of 1 second to 300 seconds.

The speed at which the curable composition is pulled up when the lens substrate is immersed is preferably in a range of 10 to 400 mm/min.

Heat drying is preferable as the drying method used after pulling up the lens substrate. Also, the drying temperature used after pulling up the lens substrate is preferably 20° C. to 130° C. Furthermore, drying after pulling up the lens substrate is preferably performed for 0 to 90 minutes.

The film thickness of the coating film formed through the above steps may be in a range of 0.1 to 100 μm (preferably, 0.5 to 5.0 μm, and even more preferably 1.0 to 3.0 μm), for example.

Advantageous Effects of Disclosure

According to an example of the present disclosure, it is possible to suppress the generation of stray light and productivity is improved even when a coating film is provided so as to cover substrate protruding portions on a lens substrate that contributes to the effect of suppressing near-sightedness.

BRIEF DESCRIPTION OF DRAWINGS

FIG. 1(a) is a photograph showing results obtained by examining the flux of a coating film liquid using an optical microscope when a lens substrate provided with only one substrate protruding portion with a diameter of 3 mm was immersed in the coating film liquid and was then pulled up, and FIG. 1(b) is a photograph showing results obtained by examining the flux of a coating film liquid using an optical microscope when a lens substrate on which two substrate protruding portions were arranged side-by-side was immersed in the coating film liquid and was then pulled up.

DESCRIPTION OF EMBODIMENTS

Figure 2:
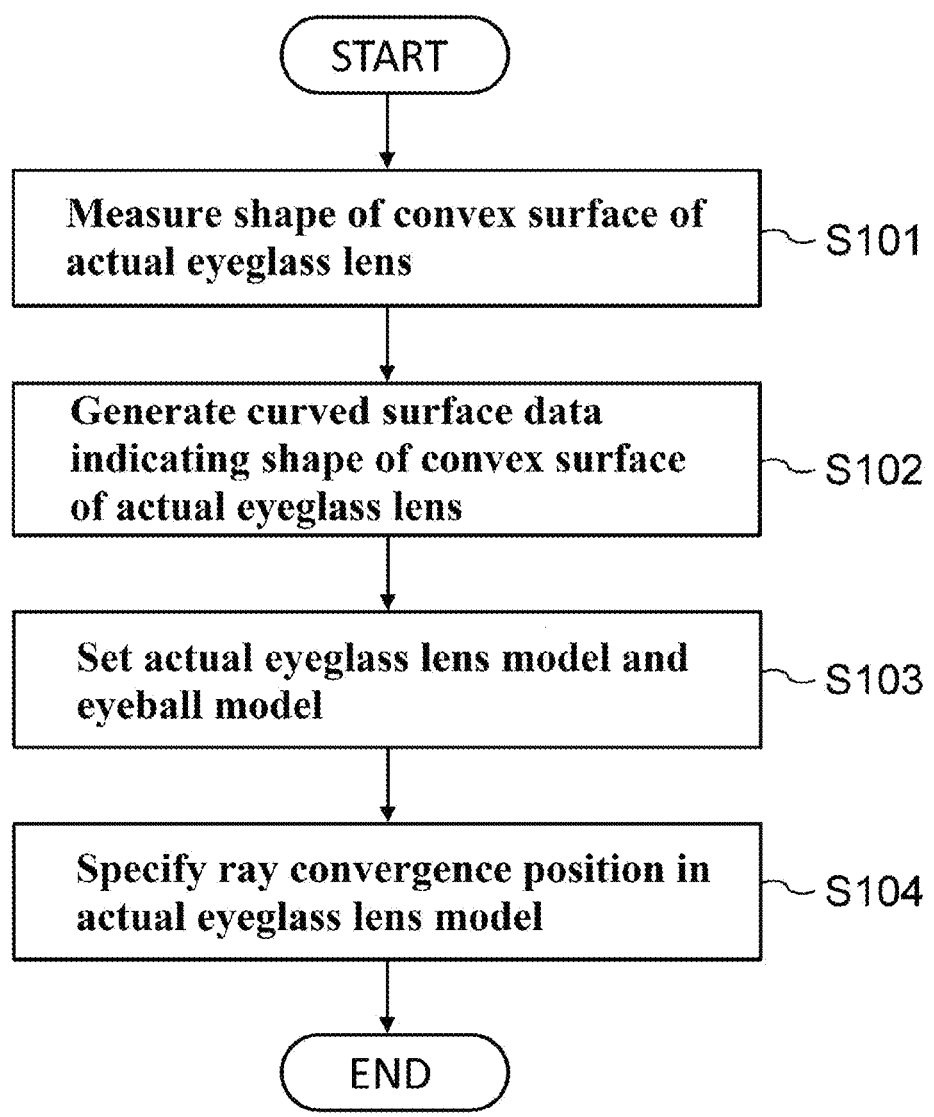
FIG. 2 is a flowchart showing the flow of a method for inspecting an eyeglass lens according to one aspect of the present disclosure.

The following describes embodiments of the present disclosure. The following description that is based on the drawings is exemplary, and the present disclosure is not limited to the aspects that are described as examples.

An eyeglass lens according to this specification has an object-side surface and an eyeball-side surface. The "object-side surface" is the surface that is located on the object side when a wearer wears glasses including the eyeglass lens. The "eyeball-side surface" is the surface that is located on the opposite side, that is, the eyeball side, when the wearer wears the glasses including the eyeglass lens. This relationship also applies to the lens substrate that is to be the base of an eyeglass lens. That is, the lens substrate includes an object-side surface and an eyeball-side surface.

In this specification, in a state where the eyeglass lens is worn, out of the top and bottom directions, the top direction is referred to as "upward" (the zero-o'clock direction with a rotation angle of 0 degrees when viewed from the center of the eyeglass lens), and the opposite direction is referred to as "downward" (the six-o'clock direction with a rotation angle of 180 degrees). The top-bottom direction refers to a direction perpendicular to the direction of an optical axis of the eyeglass lens when the wearer faces forward, and is also referred to as a "vertical direction".

Note that the lens center indicates the optical center or the geometric center of the eyeglass lens. In this specification, a case where the optical center substantially matches the geometric center will be described.

<Method for Manufacturing Eyeglass Lens>

A method for manufacturing an eyeglass lens according to an aspect of the present disclosure is as follows.

"A method for manufacturing an eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, the method including forming the coating film by immersing the lens substrate in a coating film liquid, pulling up the lens substrate, and drying the coating film liquid on the lens substrate while or after the coating film liquid flows under its own weight."

There is no limitation on the lens substrate as long as it includes a substrate base portion and a plurality of substrate protruding portions that protrude from the substrate base portion.

The substrate base portion refers to a portion with a shape that can realize a power of the wearer's prescription.

The substrate protruding portion refers to a portion that corresponds to a minute convex portion disclosed in Patent Document 1. An eyeglass lens according to an aspect of the present disclosure can suppress the progression of near-sightedness. As a result, the lens substrate can suppress the progression of near-sightedness. Similarly to the minute convex portions in Patent Document 1, a plurality of substrate protruding portions according to one aspect of the present disclosure may be formed on at least the object-side surface or the eyeball-side surface of a lens substrate, and this state is referred to as "protruding from the substrate base portion on the surface of the lens substrate". In this specification, a case where a plurality of substrate protruding portions are only provided on the object-side surface of the lens substrate will mainly be described.

Note that a case where a plastic lens substrate or a glass lens substrate is used as the lens substrate will mainly be described in this specification. On the other hand, other substances such as a base film may be laminated on the lens substrate. If another substance is laminated on a lens substrate, convex portions and concave portions resulting from the plurality of substrate protruding portions will be present on the lens substrate, and the plurality of substrate protruding portions can provide the effect of suppressing the progression of near-sightedness even when the other substance is laminated onto the lens substrate.

In one aspect according to the present disclosure, a coating film is formed on the lens substrate. The coating film may be formed on at least a plurality of substrate protruding portions, and it is preferable to form the coating film on both sides of the lens substrate because a dipping method is to be adopted.

With the dipping method in this specification, the lens substrate is immersed in a coating film liquid from the lowermost end thereof and the uppermost end is ultimately immersed therein such that the entire lens substrate is immersed in the coating film liquid, and when the lens substrate is pulled up, the lens substrate is pulled upward in the opposite direction, i.e., in the vertical direction, for example. On the other hand, the lens substrate may be immersed in the coating film liquid in a state where the lens substrate is inclined relative to the up-down direction in the horizontal direction to some extent, and then be pulled up in that state. In either case, the coating film liquid on the lens substrate flows downward along the lens substrate under its own weight.

There is no limitation on the coating liquid as long as a coating film can be formed by immersing lens substrate in the coating film liquid, pulling up the lens substrate, and drying the coating film liquid on the lens substrate while or after the coating film liquid flows under its own weight.

If the volatility of the coating film liquid is relatively high, the lens substrate is immersed in the coating film liquid and pulled up, and drying is completed while the coating film liquid is still flowing under its own weight. On the other hand, if the volatility of the coating film liquid is relatively low, drying is not completed while the coating film liquid is still flowing under its own weight. Thus, after the lens substrate is pulled up, the coating film liquid is dried again so as to form a coating film.

Regardless of the volatility of the coating film liquid, the lens substrate is immersed in the coating film liquid and pulled up, and the coating film liquid somewhat flows under its own weight, which means that the coating film liquid flows downward along the lens substrate. As described in [Solution to Problem], the thickness of the coating film can be varied over surrounding regions of the substrate protruding portions due to the flowing of the coating film liquid.

FIG. 1(a) is a photograph showing results obtained by examining the flux of a coating film liquid using an optical microscope when a lens substrate provided with only one substrate protruding portion with a diameter of 3 mm was immersed in the coating film liquid and was then pulled up, and FIG. 1(b) is a photograph showing results obtained by examining the flux of a coating film liquid using an optical microscope when a lens substrate on which two substrate protruding portions were arranged side-by-side was immersed in the coating film liquid and was then pulled up.

As shown in FIG. 1(a), the flux of the coating film liquid is relatively low in an upper portion (the vicinity at a rotation angle of 0 degrees) and a lower portion (the vicinity at a rotation angle of 180 degrees) of a surrounding region of a substrate protruding portion. If the coating film liquid is dried in this state, the coating film will be relatively thin in the upper portion and the lower portion of the surrounding region of the substrate protruding portion.

On the other hand, as shown in FIG. 1(a) as well, the flux of the coating film liquid is relatively large in portions other than the upper portion and the lower portion of the surrounding region of the substrate protruding portion. If the coating film liquid is dried in this state, the coating film will be relatively thick in portions other than the upper portion and the lower portion of the surrounding region of the substrate protruding portion. This trend is also seen in FIG. 1(b) in which two substrate protruding portions are provided.

As shown in FIG. 1(a), even in a case where only one substrate protruding portion is provided, the thickness of the coating film varies over the surrounding region of the substrate protruding portion. Thus, as shown in FIG. 1(b), even in a case where multiple substrate protruding portions are provided, of course, the thickness of the coating film varies as described in the item "Examples" described later. These results mean that, by adopting the method according to one aspect of the present disclosure, the thickness of the coating film varies, regardless of the number of substrate protruding portions.

Also, even when the type (plastic, glass) and the shape (the size and number of substrate protruding portions) of the lens substrate, the properties (types, viscosity, concentration, volatility) of the coating film liquid, and various conditions (the temperature of the coating film liquid, and the speed at which the lens substrate is pulled up and the film thickness of the coating film accompanying the speed) for the dipping method are changed, the coating film liquid flows under its own weight and thus the thickness of the coating film varies, as long as the dipping method is adopted for a lens substrate having the substrate protruding portions. This was confirmed through intensive studies conducted by the inventors of the present disclosure.

With the above method for manufacturing an eyeglass lens according to one aspect of the present disclosure, it is possible to suppress the generation of stray light even when a coating film is provided so as to cover substrate protruding portions on a lens substrate that contributes to the effect of suppressing near-sightedness, and productivity is improved.

The lens substrate, the substrate protruding portions, the coating film, the coating film liquid, specific examples (preferably examples) of various conditions for the dipping method, and a method for measuring a stray light ratio will be described below.

[Lens Substrate]

There is no particular limitation on aspects of the sizes and arrangement of multiple substrate protruding portions on the surface of the lens substrate. The substrate protruding portion can be determined from the viewpoint of external visibility of the substrate protruding portion, designability imparted by the substrate protruding portion, adjustment of the refractive power by the substrate protruding portion, and the like, for example. The height of a substrate protruding portion may be in a range of 0.1 to 10 μm, for example, or may be in a range of 0.7 to 0.9 μm (corresponding to 3.5 D to 4.5 D). The radius of curvature of the surface of a substrate protruding portion in a plan view (i.e., when the substrate protruding portion is viewed facing the substrate protruding portion in the direction in which an optical axis extends) may be 50 to 250 mmR, for example. Also, the distance between substrate protruding portions that are adjacent to each other (the distance between an end portion of a given substrate protruding portion and an end portion of a substrate protruding portion that is adjacent to this substrate protruding portion) may be substantially the same as the value of the radius of the substrate protruding portion, for example. Also, a plurality of the substrate protruding portions can be arranged substantially uniformly near the lens center, for example.

Various lens substrates that are usually used for an eyeglass lens can be used as the lens substrate. The lens substrate may be a plastic lens substrate or a glass lens substrate, for example. The glass lens substrate may be a lens substrate made of inorganic glass, for example. From the viewpoint of being light in weight and unlikeliness to crack, a plastic lens substrate is preferable as the lens substrate. Examples of the material of the plastic lens substrate include styrene resins such as (meth)acrylic resins, allyl carbonate resins such as polycarbonate resins, allyl resins, and diethylene glycol bis(allyl carbonate) resin (CR-39), vinyl resins, polyester resins, polyether resins, urethan resins obtained through a reaction between an isocyanate compound and a hydroxy compound such as diethylene glycol, thiourethane resins obtained through a reaction between an isocyanate compound and a polythiol compound, and cured products (generally called transparent resins) obtained by curing a curable composition containing a (thio)epoxy compound having one or more disulfide bonds in the molecule. The curable composition may be referred to as a "polymerizable composition". An uncolored lens substrate (colorless lens) or a colored lens substrate (colored lens) may be used as the lens substrate. There is no particular limitation on the thickness and the diameter of the lens substrate. The thickness (central thickness) may be about 1 to 30 mm, and the diameter may be about 50 to 100 mm, for example. The lens substrate may have a refractive index of about 1.60 to 1.75, for example. However, the refractive index of the lens substrate is not limited to the above-mentioned range, and may be within the above-mentioned range, or may be larger or smaller than the above-mentioned range. The refractive index as used in the present disclosure and this specification refers to a refractive index for light at a wavelength of 500 nm. The lens substrate can be molded using a known molding method such as casting polymerization. By molding a lens substrate through casting polymerization using a mold having a molding face provided with a plurality of concave portions, a lens substrate provided with the substrate protruding portions on at least one surface can be obtained, for example.

[Coating Film]

An aspect of a coating film to be provided on the surface of the lens substrate having the substrate protruding portions is a cured film formed by curing a curable composition (the coating film liquid described so far) containing a curable compound. Such a cured film is commonly called a hard coating film, and contributes to improving the durability of the eyeglass lens. A curable compound means a compound having a curable functional group, and a curable composition means a composition containing one or more curable compounds.

An aspect of the curable composition (coating film liquid) for forming a cured film may be a curable composition containing an organosilicon compound as the curable compound, or a curable composition containing metal oxide particles together with an organosilicon compound. An example of a curable composition that can form a cured film is a curable composition described in JP S63-10640A.

An aspect of the organosilicon compound may be an organosilicon compound represented by General Formula (I) below or a hydrolysate thereof.

$$(R^1)_a(R^3)_b Si(OR^2)_{4-(a+b)} \qquad (I)$$

In General Formula (I), $R^1$ represents an organic group having a glycidoxy group, an epoxy group, a vinyl group, a methacryloxy group, an acryloxy group, a mercapto group, an amino group, a phenyl group, or the like, $R^2$ represents an alkyl group having 1 to 4 carbon atoms, an acyl group having 1 to 4 carbon atoms, or an aryl group having 6 to 10 carbon atoms, $R^3$ represents an alkyl group having 1 to 6 carbon atoms or an aryl group having 6 to 10 carbon atoms, and a and b independently represent 0 or 1.

The alkyl group having 1 to 4 carbon atoms represented by $R^2$ is a linear or branched alkyl group, and specific examples thereof include a methyl group, an ethyl group, a propyl group, and a butyl group.

Examples of the acyl group having 1 to 4 carbon atoms represented by $R^2$ include an acetyl group, a propionyl group, an oleyl group, and a benzoyl group.

Examples of the aryl group having 6 to 10 carbon atoms represented by $R^2$ include a phenyl group, a xylyl group, and a tolyl group.

The alkyl group having 1 to 6 carbon atoms represented by $R^3$ is a linear or branched alkyl group, and specific examples thereof include a methyl group, an ethyl group, a propyl group, a butyl group, a pentyl group, and a hexyl group.

Examples of the aryl group having 6 to 10 carbon atoms represented by $R^3$ include a phenyl group, a xylyl group, and a tolyl group.

Specific examples of the compound represented by General Formula (I) above include compounds disclosed in paragraph [0073] of JP 2007-077327A. Since the organosilicon compound represented by General Formula (I) has a curable group, a hard coating film can be formed as the cured film by performing curing processing after the application of such an organosilicon compound.

The metal oxide particles can contribute to the adjustment of the refractive index of the cured film and the improvement of the hardness thereof. Specific examples of the metal oxide particles include tungsten oxide ($WO_3$) particles, zinc oxide (ZnO) particles, silicon oxide ($SiO_2$) particles, aluminum oxide ($Al_2O_3$) particles, titanium oxide ($TiO_2$) particles, zirconium oxide ($ZrO_2$) particles, tin oxide ($SnO_2$) particles, beryllium oxide (BeO) particles, and antimony oxide ($Sb_2O_5$) particles, and these particles can be used alone or in combination of two or more types. It is preferable that the metal oxide particles have a particle diameter within a range from 5 to 30 nm from the viewpoint of achieving both scratch resistance and optical properties in the cured film. The content of the metal oxide particles in the curable composition can be set as appropriate in consideration of the refractive index and the hardness of a cured film to be formed, and may be normally set to about 5 to 80 mass % of the solid content in the curable composition. It is preferable that the metal oxide particles are colloidal particles from the viewpoint of the dispersibility in the cured film.

[Dipping Method]

A coating liquid for forming a cured film (coating film) on the surface of the lens substrate provided with the substrate protruding portions is supplied by immersing the lens substrate in a coating film liquid (curable composition). This causes liquid to intentionally pool in the surrounding regions of the substrate convex portions so that the film thickness of the coating film (the above cured film) is varied over the surrounding regions of the substrate protruding portions.

A cured film can be formed using the following method. A coated film is formed, for example, by applying a curable composition prepared by mixing components and optional components such as an organic solvent, a surfactant (leveling agent), and a curing agent as needed, onto the surface of the lens substrate provided with the substrate protruding portions through immersion, or applying it onto the surface of the lens substrate via another film. Curing processing (e.g., heating and/or light irradiation) is performed on this coated film according to the type of curable compound. If curing processing is performed through volatilization, for example, a curing reaction of the curable compound in the coated film may be caused to progress by placing the lens substrate provided with the coated film made of the curable composition in an environment at an ambient temperature of 50° C. to 150° C. for about 30 minutes to 3 hours in a state where the lens substrate is inclined while the curable composition has fluidity. Note that a drying process may be performed together with this curing reaction.

The viscosity of the curable composition for forming a coating film on the surface of the lens substrate provided with the substrate protruding portions can be set as appropriate, and the curable composition preferably has a viscosity in a range from 1 to 50 mPa·s, more preferably a range from 1 to 40 mPa·s, and even more preferably a range from 1 to 20 mPa·s. The viscosity as used in the present disclosure and this specification refers to the viscosity at a liquid temperature of 25° C.

The temperature of the curable composition when the lens substrate is immersed is preferably in a range of 0° C. to 30° C.

The boiling point of a solvent that constitutes the curable composition when the lens substrate is immersed is preferably in a range of 30° C. to 200° C., and preferably in a range of 60° C. to 120° C. There is no limitation on the type of solvent, and methanol, toluene, or the like can be used, for example.

The concentration of the curable composition when the lens substrate is immersed is preferably in a range of 1 wt % to 50 wt %.

The immersion time when the lens substrate is immersed is preferably in a range of 1 second to 300 seconds.

The speed at which the curable composition is pulled up when the lens substrate is immersed is preferably in a range of 10 to 400 mm/min.

Also, an aspect of the coating film formed on the surface of the lens substrate provided with the substrate protruding portions is a coating film that is commonly called a primer film and contributes to improving adherence between layers. Examples of a coating film liquid capable of forming such a coating film include compositions (referred to as "dry solidifiable compositions" hereinafter) in which a resin component such as a polyurethane resin is dispersed in a solvent (water, an organic solvent, or a mixed solvent thereof). Solidification of such a composition is advanced by removing a solvent through drying. Drying can be performed through a drying process such as air drying or heat drying. Note that a curing reaction may also be performed together with this drying process.

Heat drying is preferable as the drying method used after pulling up the lens substrate. Also, the drying temperature used after pulling up the lens substrate is preferably 20° C. to 130° C. Furthermore, drying after pulling up the lens substrate is preferably performed for 0 to 90 minutes. A drying time of 0 minutes means that the flowing coating film liquid is dried, and the coating film liquid is solidified through volatilization of a solvent without performing a drying step, and a coating film is formed.

The film thickness of the coating film formed through the above steps may be in a range of 0.1 to 100 μm (preferably, 0.5 to 5.0 μm, and even more preferably 1.0 to 3.0 μm), for example. However, the film thickness of the coating film is determined according to the function required for the coating film, and is not limited to the above-mentioned range.

One or more additional coating films can also be formed on the coating film. Examples of such coating films include various coating films such as an antireflection film, a water repellent or hydrophilic antifouling film, and an antifogging film. A known technique can also be applied to a method for forming these coating films.

[Method for Measuring Stray Light Ratio]

Stray light rays are rays that enter from the object-side surface of the eyeglass lens and are emitted from the eyeball-side surface, and refer to rays that do not pass through the vicinity of the predetermined position A at which rays are converged by the eyeglass lens, and also do not pass through the vicinity of the position B at which rays are converged by the substrate protruding portions and the coating film convex portions. Stray light rays cause blurring of the wearer's visual field. Thus, it is preferable to reduce the ratio of stray light rays (also referred to as "stray light ratio" hereinafter) relative to rays that enter from the object-side surface of the eyeglass lens and are emitted from the eyeball-side surface.

One of the reasons stray light rays occur is the coating film. If the shape extending from the convex surface, which is the object-side surface serving as the base, changes excessively smoothly at the base of the coating film convex portion, the resulting shape differs from the spherical shape of the substrate protruding portion, and also differs from the convex surface, which is the object-side surface. Accordingly, rays will not be focused on the retina of the wearer (the vicinity of the predetermined position A in this specification), and will not be focused in the vicinity of the position B that is closer to the object.

The "base (also referred to as a surrounding region) of a coating film convex portion" in this specification refers to the boundary between the base portion on the outermost surface of the eyeglass lens and the coating film convex portion, and the base portion in the vicinity thereof, and a portion where astigmatism begins to rapidly increase. Astigmatism (profile curve) in a cross-sectional view of the eyeglass lens can be measured using a method called coherence correlation interferometry. Also, an annular region located 0.2 times the distance between the center and the boundary from the boundary in a direction away from the center of the coating film convex portion in a plan view may be referred to as the base of the coating film convex portion.

Ray tracing calculation is used to set the stray light ratio. A situation in which a large number of rays evenly enter a predetermined range of the object-side surface of the eyeglass lens and pass through the coating film (i.e., a situation in which the eyeglass lens is worn and the wearer is looking at their surroundings) is presumed in this calculation. This "predetermined range" needs only be an optical region on the object-side surface. This "optical region" refers to a portion having a curved surface shape that realizes the power set according to the wearer on the object-side surface and the eyeball-side surface that is located opposite thereto.

Here, conditions under which the stray light ratio is determined will be described below.

FIG. 2 is a flowchart showing the flow of a method for inspecting an eyeglass lens according to one aspect of the present disclosure.

As shown in FIG. 2, first, in step S101, the shape of the object-side surface (also referred to as "convex surface" hereinafter) of the actual eyeglass lens is measured, and curved surface data representing the shape of the convex surface is generated (shape measurement step). The shape of the convex surface is measured using a noncontact three-dimensional microscope for measuring length, utilizing light interference, for example. The three-dimensional shape of the convex surface is acquired as discrete three-dimensional data (x, y, z), for example.

Then, in step S102, curved surface data is generated from the obtained data indicating the shape of the convex surface of the eyeglass lens (curved surface data generation step). Note that, if discrete three-dimensional data is used as data indicating the shape of the convex surface of the eyeglass lens, a set of B-spline curves need only be generated, for example. Also, if measured discrete three-dimensional data includes noise, moving average processing may be performed and an average value may be used, for example.

Then, in step S103, a model of the actual eyeglass lens is set based on the curved surface data (model setting step).

The model of the actual eyeglass lens is set, and an eyeball model is also set. Information relating to the wearer (e.g., the axial length and accommodation amount of the eye) may be used for an eyeball model. At this time, an eyeglass lens model may be disposed with respect to an eyeball model in consideration of the inclination of the eyeglass lens when attached to the frame thereof (a forward tilt angle and a frame tilt angle).

Then, in step S104, the position at which rays converge most when the rays have passed through the actual eyeglass lens is specified through a ray tracing process (convergence position specifying step). Specifically, the PSF (Point Spread Function) representing the luminance distribution obtained after rays emitted from an indeterminately distant light source have passed through the model set based on the curved surface data of the actual eyeglass lens is obtained.

The PSF can be obtained by tracing a large number of rays emitted from the point light source and calculating the density of spots on any plane. Then, the position (plane) on which rays are most concentrated in any plane is specified by comparing the PSFs in the relevant planes. Note that the diameter of the flux of multiple rays need only be set based on the motion diameter, and may be set to 4φ, for example.

Figure 3:
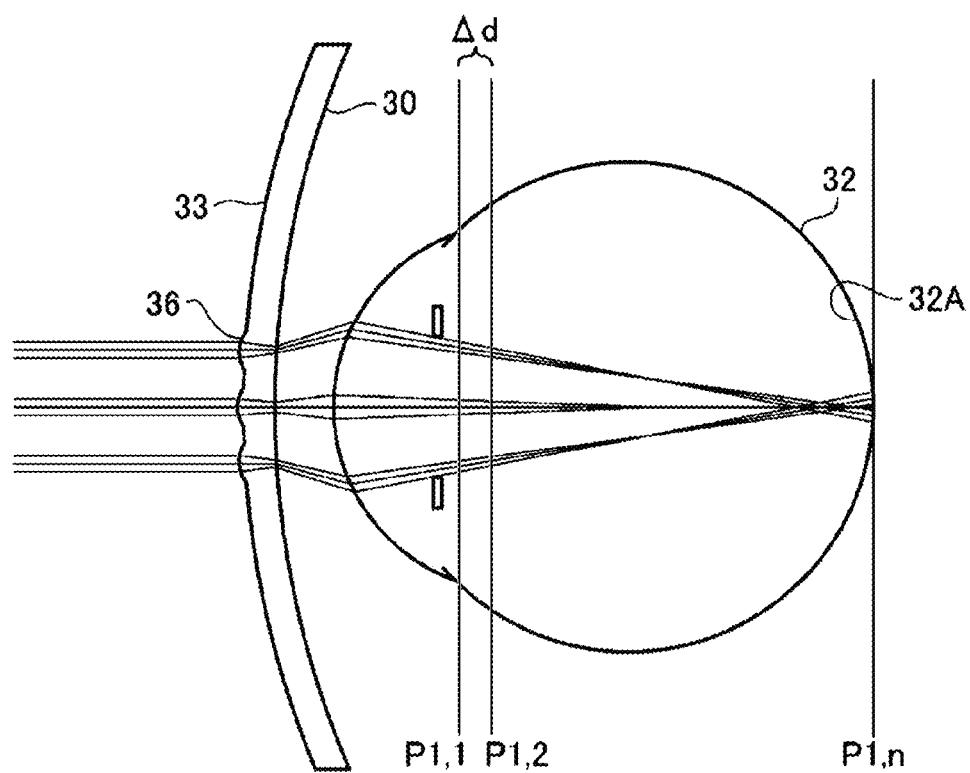
FIG. 3 is a diagram (No. 1) illustrating a method for specifying a position at which rays are concentrated.
Figure 4:
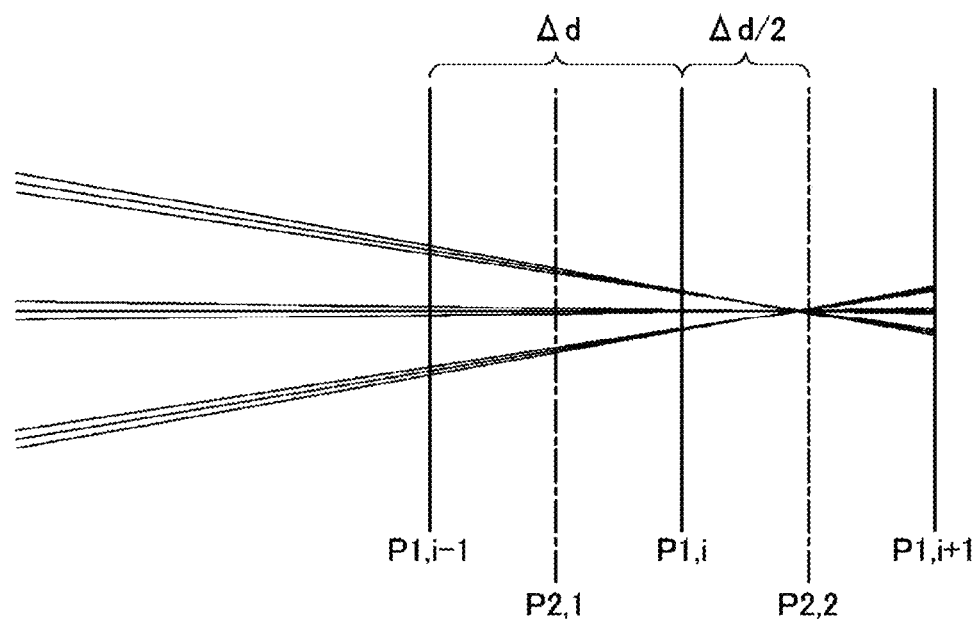
FIG. 4 is a diagram (No. 2) illustrating a method for specifying a position at which rays are concentrated.
Figure 5:
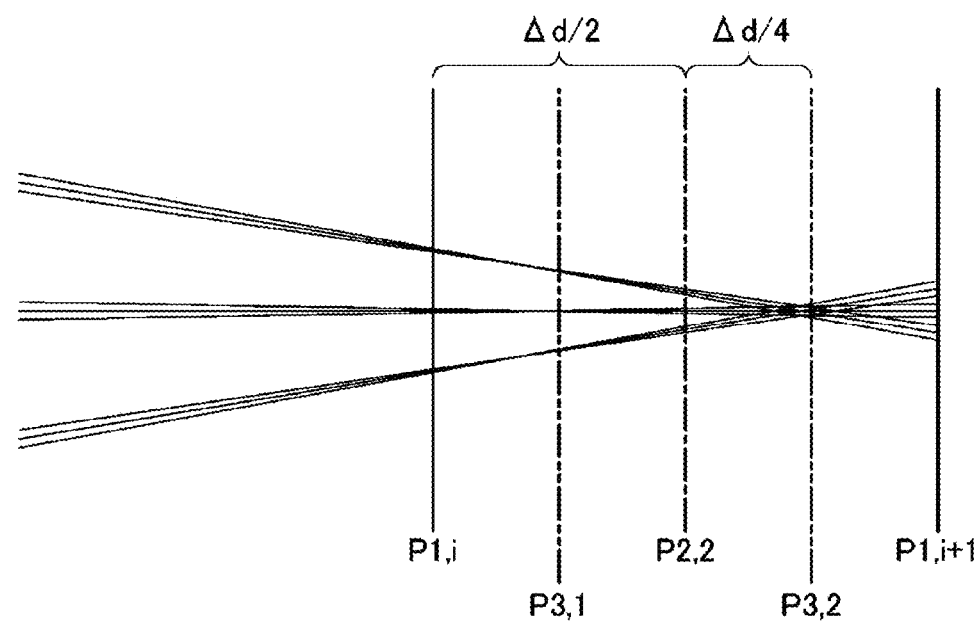
FIG. 5 is a diagram (No. 3) illustrating a method for specifying a position at which rays are concentrated.
Figure 6:
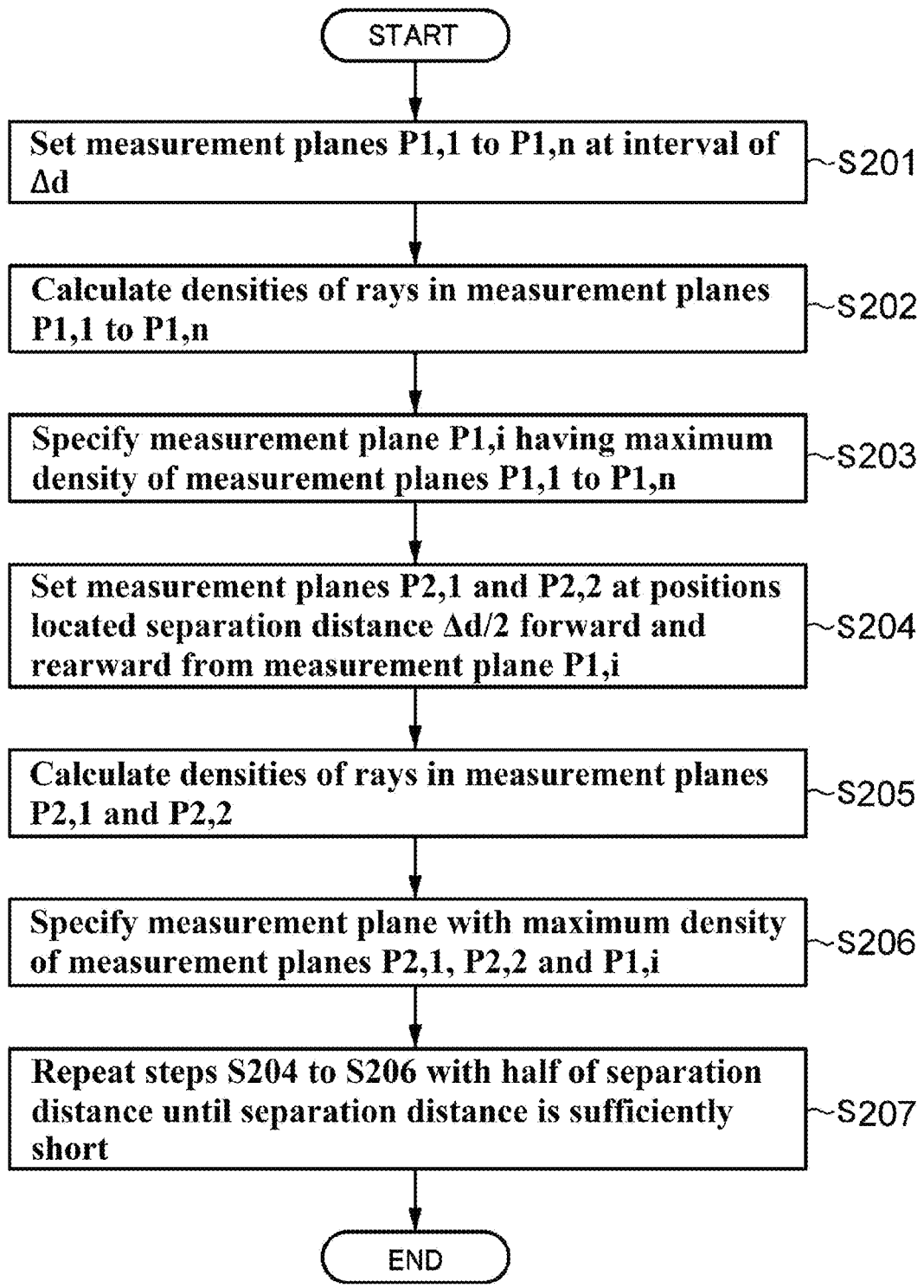
FIG. 6 is a flowchart illustrating a method for specifying a position at which rays are concentrated.

Here, a method for specifying, in step S104, the position at which rays are most concentrated will be described in more detail. FIGS. 3 to 5 are diagrams illustrating the method for specifying a position at which rays are concentrated. Also, FIG. 6 is a flowchart showing the method for specifying a position at which rays are concentrated. In FIG. 3, reference numeral 30 indicates the eyeball-side surface, reference numeral 33 indicates the object-side surface, reference numeral 36 indicates the substrate protruding portion (i.e., the coating film convex portion on the outermost surface of the eyeglass lens), reference numeral 32 indicates the eyeball model, and reference numeral 32A indicates the retina.

First, as shown in FIG. 3, in step S201, a situation is presumed in which rays pass through the coating film convex portion of the object-side surface (the convex surface) on a model. Then, measurement planes P1,1 to P1,n are set at increments of a predetermined separation interval Δd (e.g., 0.1 mm) from a predetermined distance (e.g., a position located at about 16 mm, which is the thickness of the vitreous body) from a position of 0 mm on the retina A of the eyeball model to the retina. Note that the separation interval Δd may be set to an interval of 0.2 mm or ⅕₀ of the axial length of the eye.

Then, a ray tracing process is performed, and the densities of rays in the measurement planes P1,1 to P1,n are calculated in step S202. The densities of rays need only be calculated by setting a lattice-shaped grid (e.g., 0.1 mm×0.1 mm) to each measurement plane and calculating the number of rays passing through the grids, for example.

Then, in step S203, in order to specify a measurement plane where rays that have entered the convex portion have the maximum density, in the measurement planes P1,1 to P1,n, the measurement plane P1,i where rays have the first maximal density from the predetermined distance is specified. In order to omit calculation, calculation of the ray density may be started from the measurement plane P1, and calculation of this step may be terminated when after the first maximal value is detected, the value obtained by calculating the ray density decreases to about an intermediate value between the value in the measurement plane P1 and the first maximal value.

Then, as shown in FIG. 4, in step S204, the measurement plane P2,1 and measurement plane P2,2 are set at positions located a separation distance Δd/2 forward and rearward from the measurement plane P1,i with the maximum density. Then, the densities of rays in the measurement plane P2,1 and the measurement plane P2,2 are calculated in step S205. A measurement plane with the maximum density is specified in the measurement planes P2,1, P2,2, and P1,i in step S206.

Then, in step S207, the same steps as steps S204 to S206 are repeated until the separation distance becomes sufficiently short. That is, as shown in FIG. 5, a step of setting a new measurement plane (P3,1 and P3,2 in FIG. 5) at a position located a new separation distance (Δd/4 in FIG. 5), which is half of the previous separation distance, forward and rearward from the measurement plane (P2,2 in FIG. 5) that previously had the maximum density, a step of calculating the density of rays in the new measurement plane, and a step of specifying the measurement plane that previously had the maximum density and a measurement plane out of the new measurement planes that has the maximum are repeated.

It is possible to specify a position at which rays are concentrated in the direction in which an optical axis extends (the thickness direction of the lens, the Z-axis) through the above-described steps.

The position at which rays converge on a plane perpendicular to the direction in which an optical axis extends (i.e., on the specified measurement plane) is then specified. The above-described PSFs are used to specify this position. A portion (a point on the measurement plane) at which rays are most concentrated is specified using the PSFs, as a ray convergence position B on the measurement plane.

Also, the number of rays located outside a radius of 0.1 mm from the ray convergence position B on the measurement plane is calculated, for example. The inner side of a radius of 0.1 mm from the convergence position B refers to the "vicinity of the position B" in this specification, for example.

Rays located inside a radius of 0.1 mm from the predetermined position A at which rays are converged by the eyeglass lens (i.e., normal rays that converge at the position A) are subtracted from the rays outside the above range. The inner side of a radius of 0.1 mm from the convergence position A refers to the "vicinity of the position A" in this specification, for example.

The rays remaining after subtraction do not converge in the vicinity of the position A at which rays converge due to the eyeglass lens, and do not converge in the vicinity of the position B at which rays converge due to the coating film convex portion and that is closer to the object. Such rays are referred to as stray light in this specification.

<Eyeglass Lens>

An eyeglass lens obtained using a method according to one aspect of the present disclosure is as follows.

"An eyeglass lens that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions,
   in which the thickness of the coating film is varied over surrounding regions of the substrate protruding portions."

As described in the section regarding effects of the present disclosure, with the eyeglass lens obtained using a method according to one aspect of the present disclosure, the generation of stray light is further suppressed, compared to a case where a coating film is formed on the minute convex portions described in a conventional technique, that is, Patent Document 1, using a conventional spin coating method.

The stray light ratio of the eyeglass lens according to one aspect of the present disclosure is 30% or less. Accordingly, even after a coating film is formed on the lens substrate, the effect of suppressing near-sightedness can be sufficiently exhibited.

Considering that one of the reasons for the generation of stray light rays is the coating film and that the coating film is essential for the eyeglass lens according to one aspect of the present disclosure, the stray light ratio may be set to more than 0% (or 0% or more, or 2% or more) and 20% or less. Furthermore, it is preferable to reduce the stray light ratio, and thus the stray light ratio is preferably set to 20% or less, more preferably set to 15% or less (more preferably less than 15%), and further preferably set to 10% or less (preferably less than 10%).

Furthermore, it is preferable that, when each substrate protruding portion is viewed in a plan view, the coating film is thin in a region extending in a predetermined direction in the surrounding region of the substrate protruding portion, i.e., in the surrounding regions of all of the substrate protruding portions, and a region extending in the opposite direction to the predetermined direction, and a portion with a thick coating film is present in a region extending in other directions.

In this specification, an example is mainly described in which the lens substrate is immersed in and pulled up in the up-down direction as described before, and thus the coating film liquid flows in a direction from an upper portion to a lower portion of the lens substrate. Thus, in this example, the region that is described in the previous paragraph and extends in the predetermined direction where the coating film is thin refers to an upper portion of the substrate protruding portion (predetermined direction=zero-o'clock direction with a rotation angle of 0 degrees when viewed from geometric center of substrate protruding portion) and a lower portion of the substrate protruding portion (opposite direction to predetermined direction=six-o'clock direction with a rotation angle of 180 degrees when viewed from geometric center of substrate protruding portion).

Also, "other directions" in the previous paragraph refer to directions other than the upward direction and the downward direction (i.e., rotation angle exceeds 0 degrees and is less than 180 degrees and exceeds 180 degrees and is less than 360 degrees when viewed from the geometric center of the substrate protruding portion) in the above example. More specifically, a region of a surrounding region of each substrate protruding portion where the coating film is relatively thick is a region spreading clockwise from a predetermined direction to an angle of 15 to 145 degrees and 215 to 345 degrees (preferably 50 to 110 degrees and 250 to 310 degrees centered on 80 degrees and 280 degrees) when viewed from the geometric center of the substrate protruding portion.

It is preferable that the ratio between the largest value and the smallest value of the thickness of the coating film extending over the surrounding regions of the substrate protruding portions is large. The fact that a finished eyeglass lens includes convex portions and concave portions (in particular, the effect of suppressing the progression of near-sightedness is exhibited) means that, even when a coating film is thick over a surrounding region of a substrate protruding portion, the thickness of the coating film is not thick enough to completely hide the shape of the substrate protruding portion.

That is, the largest value of the thickness of the coating film extending over the surrounding regions of the substrate protruding portions is a reasonable value (a value obtained when a coating film is provided on substrate protruding portions using a conventional spin coating method) as long as the eyeglass lens can exhibit the effect of suppressing the progression of near-sightedness.

In that case, if the smallest value of the thickness of the coating film extending over the surrounding regions of the substrate protruding portions can be set to a small value, the shape of the outermost surface of the eyeglass lens approximates the shape of the substrate protruding portions. This means that the stray light ratio of a portion where the thickness of the coating film is smallest decreases.

Thus, the stray light ratio relating to a portion of the outermost surface of the eyeglass lens that corresponds to one substrate protruding portion is lower than in a case where a conventional spin coating method is adopted. In light of the above, it is preferable that a value obtained by dividing the smallest value of the thickness of a coating film extending over surrounding regions of substrate protruding portions by the largest value of the thickness of the coating film (the smallest value/the largest value) is in a range of 1/1.5 (preferably ½) to ¹/₁₀. In this specification, the state where (the smallest value/the largest value) is 1/1.5 (preferably ½) or less is referred to as the "varied thickness".

According to one aspect of the present disclosure described above, the thickness of the coating film is varied using a dipping method. On the other hand, even when the thickness of the coating film is made uniform using a dipping method in the same manner as for the spin coating method, the stray light ratio can be significantly reduced (Examples 4 and 5). The stray light ratio can be set to 5% or less as a specific numerical value. A specific method therefor includes usage of a solvent with a low boiling point in a coating film liquid or increasing the ratio of a solvent in the coating film liquid.

The viscosity of the curable composition for forming a coating film on the surface of the lens substrate provided with the substrate protruding portions is set to a range from 1 to 5 mPa·s, for example. Also, the concentration of the curable composition when the lens substrate is immersed is in a range of 1 wt % to 20 wt %, for example.

With this method, the shape of a coating film convex portion can be extremely approximated to the shape of a substrate protruding portion directly below the coating film convex portion. Thus, the stray light ratio can be significantly reduced. On the other hand, it is difficult to increase the film thickness because the ratio of the solvent in the coating film liquid is increased and the ratio of raw materials in the coating film is reduced. Therefore, it is appropriate to set the film thickness to 2.0 µm or less. In that case, one aspect of the present disclosure described above is advantageous in terms of durability.

In any case, the technical ideas of the present disclosure are to form the coating film on the substrate base portion and the substrate protruding portions, using a dipping method. Which dipping method to be used need only be determined according to whether the stray light ratio or durability is to be emphasized.

Note that "convergence" in this specification refers to converging in at least one of the vertical direction and the horizontal direction. Also, the number of convergence positions need not be one, and the convergence positions may vary in the direction in which an optical axis extends depending on a portion in one coating film protruding portion.

EXAMPLES

Next, examples will be described, and the present disclosure will be described in detail. Needless to say, the present disclosure is not limited to the following examples.

Example 1

The following lens substrate was produced. Note that no other substance was laminated on the lens substrate. The prescription power was set to 0.00 D for S (spherical power) and 0.00 D for C (cylinder power).

Diameter of lens substrate in plan view: 100 mm
Type of lens substrate: PC (polycarbonate)
Refractive index of lens substrate: 1.589
Base curve of lens substrate: 3.00 D
Surface provided with substrate protruding portions: Object-side surface
  Shape of substrate protruding portion in plan view: Perfect circle (diameter 1 mm)
  Height of substrate protruding portion from substrate base portion: 0.8 µm
Arrangement of substrate protruding portions in plan view: Discrete arrangement in which centers of substrate protruding portions independently serve as vertexes of equilateral triangle (the center of each substrate protruding portion is located at the vertex of a honeycomb structure)
Range in which substrate protruding portions are provided: within circle with a radius of 17 mm from lens center Pitch between substrate protruding portions (the distance between the centers of substrate protruding portions): 1.5 mm A coating film was formed on both surfaces (the entirety of upper and lower surfaces) of this lens substrate using a dipping method. The immersion direction and pulling-up direction were set to the vertical direction. Various conditions for the coating film liquid and the dipping method were as follows.

Type of coating film liquid: Thermosetting coating agent
Temperature of coating film liquid: 10° C.
Viscosity of coating film liquid: 10 mPa·s
Boiling point of solvent (methanol) for coating film liquid: 64.7° C.
Immersion time: 3 minutes
Pulling-up speed: 60 mm/min
Drying method after pulling-up: Heating
Drying temperature after pulling-up: 110° C.
Drying time after pulling-up: 90 minutes Comparative Example 1

A coating film was formed on both surfaces of the lens substrate produced in Example 1 using a spin coating method. Everything else was the same as in Example 1. The conditions for the spin coating method were as follows.

Rotational speed: 1300 rpm
Drying method after spin coating: Heating
Drying temperature after spin coating: 110° C.
Drying time after spin coating: 90 minutes <Checking of Degree of Variation in Thickness of Coating Film>

As for Example 1, the degree of variation in the thickness of the coating film was checked. Specifically, the thickness of the coating film was obtained using a device called Talysurf CCI MP HS (manufactured by AMETEK Inc.).

Figure 7:
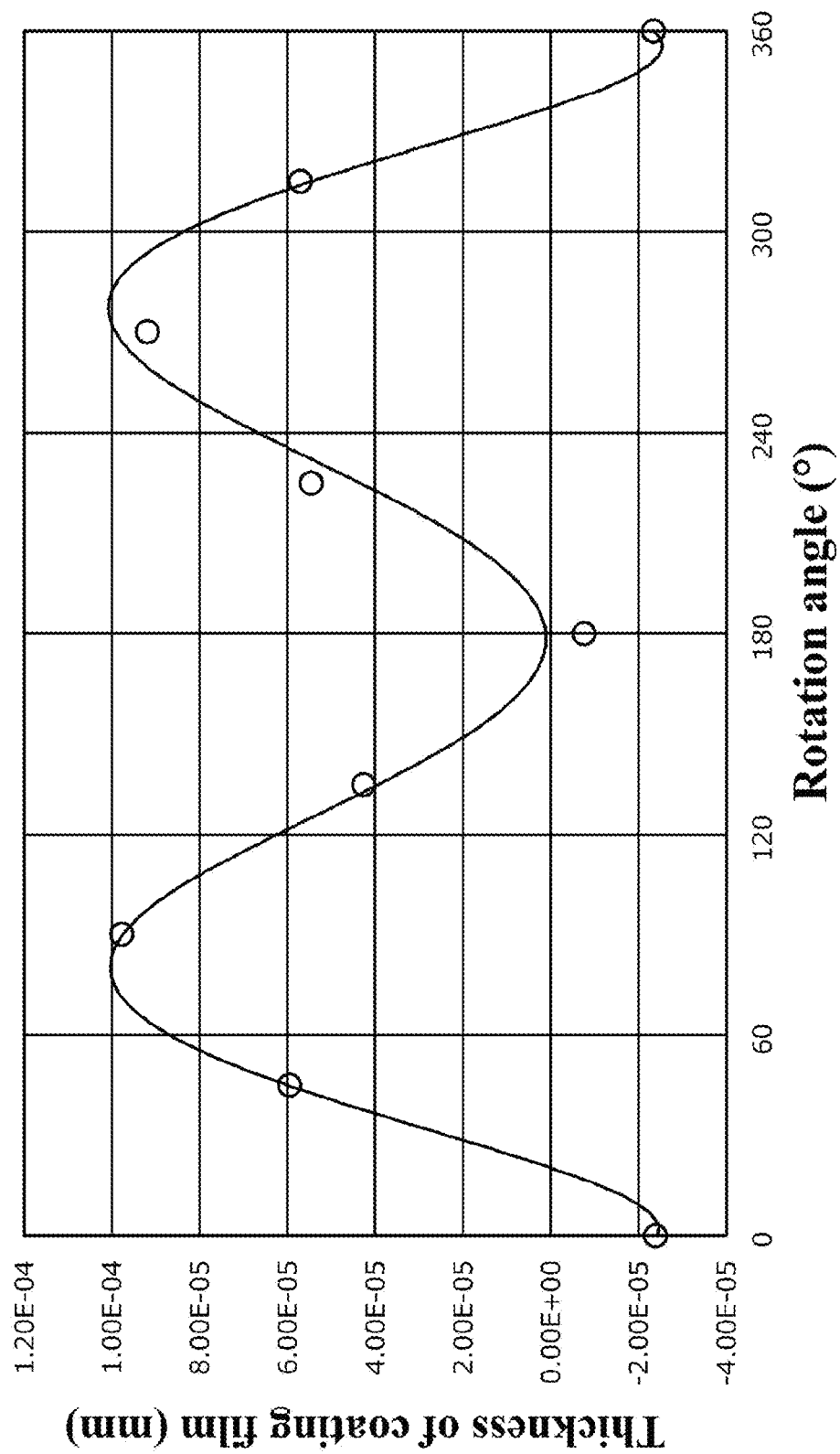
FIG. 7 is a diagram showing a plot of the thickness of a coating film provided on a surrounding region (base) of any one substrate protruding portion (0 to 360 degrees) on an eyeglass lens in Example 1, showing the thickness of the coating film on the vertical axis and the rotation angle from the zero-o'clock on the horizontal axis.

FIG. 7 is a diagram showing a plot of the thickness of the coating film provided on a surrounding region (base) of any one substrate protruding portion (0 to 360 degrees) on an eyeglass lens in Example 1, showing the thickness of the coating film on the vertical axis and the rotation angle from the zero-o'clock on the horizontal axis.

In FIG. 7, a partial shape of a sphere (virtual partially spherical shape) that is optimally approximated to the shape of the protruding portion (coating film protruding portion) on the outermost surface of the eyeglass lens obtained after the coating film was formed is presumed, and the difference in height in the Z-axial direction from this virtual partially spherical shape is set as a value on the vertical axis. Because the obtained difference is not the difference from the actual substrate protruding portion, a relatively thin portion gives a negative value in FIG. 7.

Figure 8:
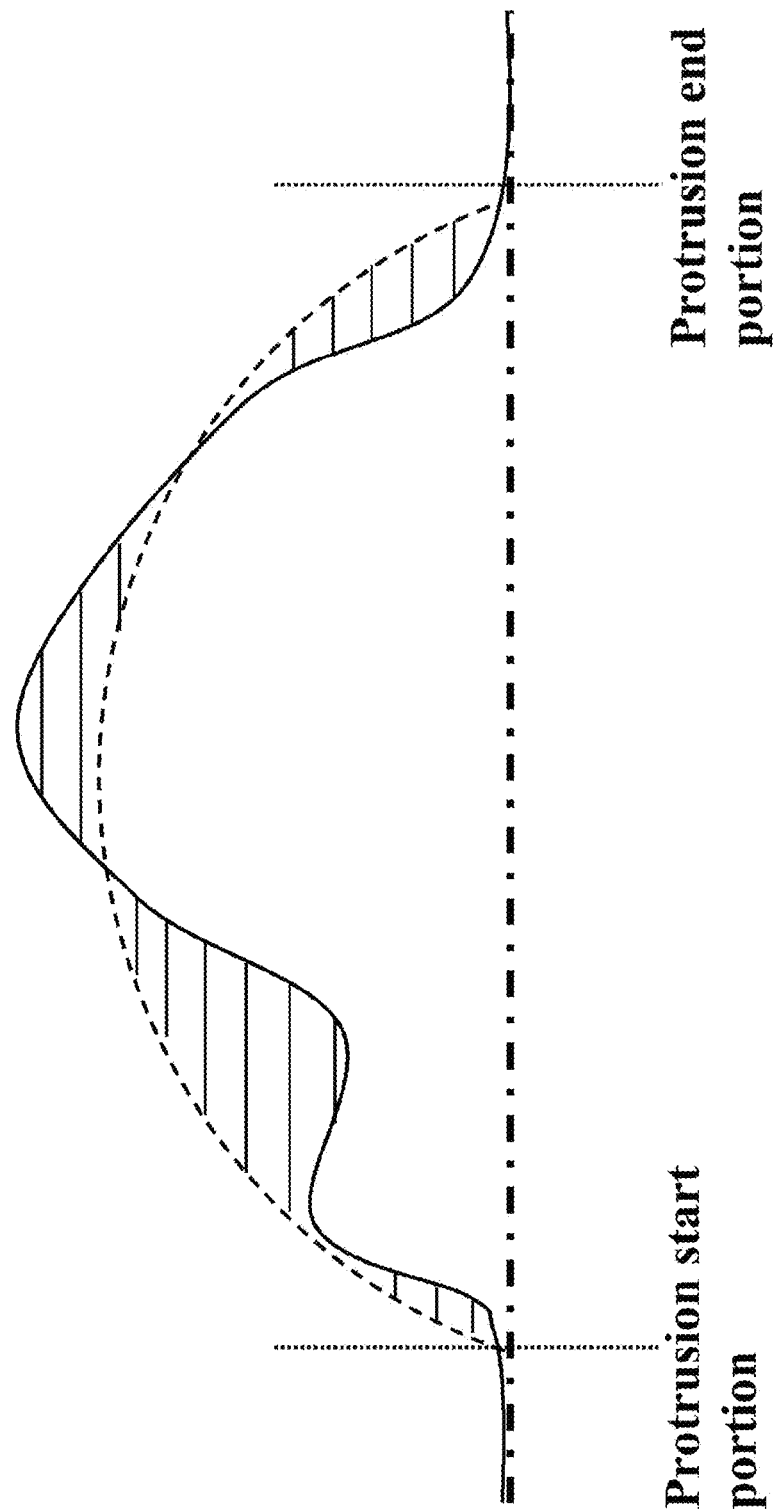
FIG. 8 is a schematic cross-sectional view illustrating an example of a coating film protruding portion (i.e., coating film convex portion) of an actual eyeglass lens and a virtual partially spherical shape. The solid line indicates the coating film protruding portion of the actual eyeglass lens, the broken line indicates the virtual partially spherical shape, a dash-dot line indicates a coating film base portion of the actual eyeglass lens, and a horizontally hatched portion indicates the difference between the virtual partially spherical shape and the shape of an actual coating film protruding portion in the thickness direction of the lens.

FIG. 8 is a schematic cross-sectional view illustrating an example of a coating film protruding portion of an actual eyeglass lens and a virtual partially spherical shape. The solid line indicates the coating film protruding portion of the actual eyeglass lens, the broken line indicates the virtual partially spherical shape, a dash-dot line indicates a base portion of the actual eyeglass lens, and a horizontally hatched portion indicates the difference between the virtual partially spherical shape and the shape of an actual coating film protruding portion in the thickness direction of the lens.

As shown in FIG. 8, a negative value on the vertical axis of the plot shown in FIG. 7 indicates that the height is lower than that of the virtual partially spherical shape. Also, the larger the negative value on the vertical axis is, the more significantly thinner the coating film is in a peripheral portion that corresponds to the negative value on the vertical axis.

Note that the virtual partially spherical shape is a partial shape of the sphere that is optimally approximated to the shape of the coating film protruding portion of the actual eyeglass lens. This virtual partially spherical shape can be obtained using the method of least squares, for example.

One specific example of optimal approximation is as follows. A spherical shape is disposed to overlap the shape of the coating film protruding portion. The difference in the lens thickness direction (an optical axis method, the Z-axis) between the two shapes of portions whose protrusions start from the base portion on the outermost surface of the eyeglass lens and end at the base portion through the vertex is squared. A virtual partially spherical shape that minimizes the sum of these values is set.

As a method other than the method of least squares, the virtual partially spherical shape may be obtained from the vertex of the coating film protruding portion and the positions of a plurality of points in the vicinity thereof. In this case, the difference may be examined by matching the vertex of the virtual partially spherical shape with the vertex of the coating film protruding portion of the actual eyeglass lens.

A point where a curve, which is obtained by curving the shape of the coating film protruding portion and differentiating the obtained curve once, has increased may be used as the protrusion start portion protruding from the base portion on the outermost surface. Also, a peak rising portion that rises from the astigmatism profile curve on a cross-section passing through the center of the coating film protruding portion in a plan view, may be used as the protrusion start portion. The protrusion end portion may be set in the same manner.

With Comparative Example 1 in which a spin coating method is adopted, the coating film in the surrounding region of the substrate protruding portion has a uniform thickness. On the other hand, with Example 1 in which the dipping method was adopted, the thickness of the coating film in the surrounding region of the substrate protruding portion varied.

<Measurement of Defocus Power and Stray Light Ratio>

Defocus power was measured for Example 1 and Comparative Example 1. The defocus power (unit: D) is a value indicating how far the luminous flux is concentrated from the retina, and can be measured using ray tracing and part of the above-described method for measuring a stray light ratio.

Also, the stray light ratio was measured using the above-described method for Example 1 and Comparative Example 1. The stray light ratio is expressed as 100×(the number of stray light rays)/(the number of incident rays).

Note that the results of measurement of the defocus power and the stray light ratio were obtained as follows. Any circular region that includes the entirety of seven coating film convex portions in a range in which the substrate protruding portions were formed (within a circle with a radius of 17 mm from the lens center) was presumed, and the values in the circular region were adopted as the results of measurements. An eyeglass model and an eyeball model were set using the above method, and multiple rays were caused to enter the circular region and the position at which the rays were concentrated was specified using the ray tracing method.

The eyeball model and various other conditions were as follows.

Axial length of eye: 24 mm
Accommodation amount of eye: 0.0 D
Distance between cornea and vertex of lens (CVD): 12.0 mm
Distance from vertex of cornea to rotation center of eyeball: 13.0 mm Hereinafter, the above conditions were adopted unless otherwise stated. However, the present disclosure is not limited to the above conditions.

Here, first, an eyeglass model in which a plurality of design shapes were used was set, and the position at which light was concentrated was examined using the method described in "Description of Embodiments". As for the convex surface of a design eyeglass model (lens substrate), the substrate base portion was a sphere, and a substrate protruding portion was constituted by a sphere having a radius of curvature that was smaller than the radius of curvature of the substrate base portion. A plurality of design shapes were set by discretely changing the radius of curvature of the substrate protruding portion with respect to the sphere of the substrate base portion having a constant curvature. Also, a value obtained by subtracting the surface refractive power [D] according to the radius of curvature of the substrate base portion from the surface refractive power [D] according to the radius of curvature of the substrate protruding portion was used as the defocus value. A correlation equation between this defocus value and a defocus power calculated from the reciprocal of the actual position at which light was concentrated was obtained using the ray tracing method used for the eyeglass model in which a plurality of design shapes were used.

Figure 9:
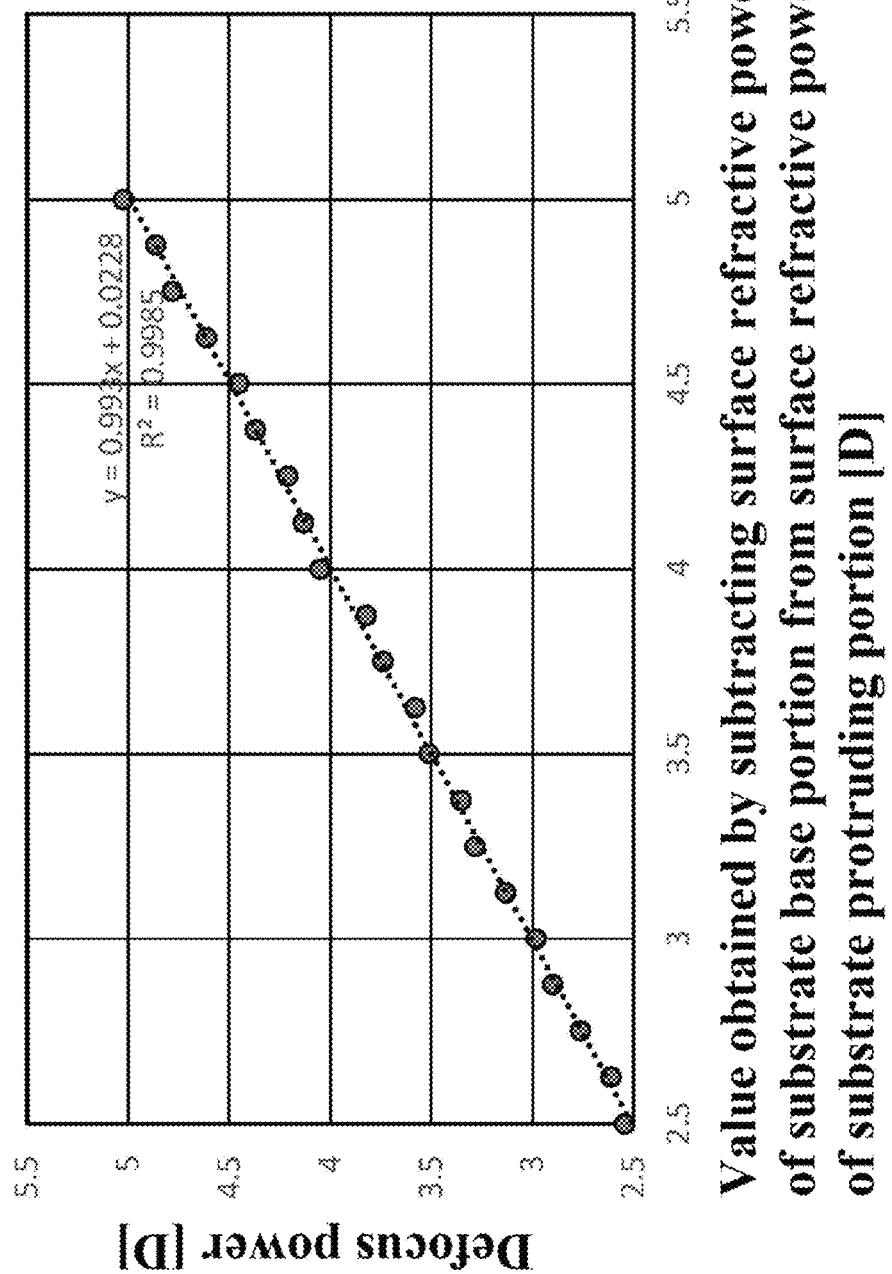
FIG. 9 is a diagram showing a plot of a correlation equation between a value (a defocus value) (horizontal axis) obtained by subtracting the surface refractive power of the substrate base portion from the surface refractive power of the substrate protruding portion and a defocus power (vertical axis) calculated based on the reciprocal of the position at which light is concentrated.

FIG. 9 is a diagram showing a plot of the correlation equation between the value (defocus value) (horizontal axis) obtained by subtracting surface refractive power of the substrate base portion from the surface refractive power of the substrate protruding portion and the defocus power (vertical axis) calculated from the reciprocal of the position at which light was concentrated.

In Example 1, the defocus power was measured by obtaining a value that corresponds to a defocus power in the eyeglass lens produced in Example 1, using this correlation equation.

The stray light ratio was also calculated from the PSF of the position at which light was concentrated and that was obtained using the method described in one aspect of the present disclosure.

In Example 1 and Comparative Example 1, it is presumed that there were seven regions where rays were concentrated on a plane that is perpendicular to the direction in which an optical axis extends at the light concentration position (the direction in which an optical axis extends) obtained at the time the defocus power was measured. This is to virtualize any circular region that includes the entirety of seven coating film convex portions. When a lattice-shaped grid is set to each measurement plane, the number of rays passing through the grids is calculated, and the grid with a certain number or more of rays passing therethrough is examined, it is conceivable that rays are concentrated and distributed in the seven regions.

In Example 1 and Comparative Example 1, the positions of the centers of gravity in the corresponding regions were obtained as a plurality of convergence positions B, and a value obtained by subtracting rays near the position A from rays outside the vicinity of the positions B was used as the number of stray light rays. The stray light ratio was calculated from the number of stray light rays, using the method described in [Description of Embodiments].

In Example 1, the defocus power was 3.73 D, and the stray light ratio was 7.7%. On the other hand, in Comparative Example 1, the defocus power was 3.51 D, and the stray light ratio was 11.25%. The eyeglass lens in Example 1 had a lower stray light ratio and a more sufficiently secured defocus power, compared to the eyeglass lens in Comparative Example 1.

Example 2

An antireflection film was formed on the lens substrate provided with the coating film produced in Example 1. Details of conditions under which the antireflection film was manufactured are described in Example 3 in JP 2013-97159A.

In Example 2, the defocus power was 3.73 D, and the stray light ratio was 7.7%. The eyeglass lens in Example 2 had the same performance as the defocus power and the stray light ratio of the eyeglass lens in Example 1. That is, it was confirmed that effects of the present disclosure were not impaired by the formation of the antireflection film.

Example 3

A second coating film liquid was prepared by reducing the amount of metal sol from the coating film liquid used in Example 1 and adding methanol. The lens substrate produced in Example 1 was immersed in the second coating film liquid. Everything else was the same as in Example 1.

In Example 3, the defocus power was 3.70 D, and the stray light ratio was 8.1%.

In Example 3 as well, the defocus power was also further improved and the stray light ratio was also further reduced, compared to a case where the coating film was formed on the minute convex portions described in Patent Document 1 using the conventional spin coating method. It is inferred that this is because convex portions and concave portions were present on the outermost surface of the eyeglass lens and the thickness of the coating film varied in the surrounding regions of the substrate protruding portions, even when properties of the coating film liquid were changed or the thickness of the coating film was changed.

Example 4

A coating film was formed on both surfaces (the entirety of upper and lower surfaces) of the lens substrate, which was the same as in Example 1, using a dipping method. The same method as in Example 1 was adopted, except that ethanol was used as the solvent of the coating film liquid and the coating film was formed such that the average of the thickness of the coating film directly above the substrate base portion was about 1.0 μm. Various conditions for the coating film liquid and the dipping method were as follows.
  Type of coating film liquid: Thermosetting coating agent
  Temperature of coating film liquid: 15° C.
  Viscosity of coating film liquid: 3 mPa·s
  Boiling point of solvent (ethanol) for coating film liquid: 78.4° C.
  Immersion time: 3 minutes
  Pulling-up speed: 7 mm/sec
  Drying method after pulling-up: Heating
  Drying temperature after pulling-up: 110° C.
  Drying time after pulling-up: 90 minutes Example 5

A coating film was formed using the same method as in Example 4, except that the pulling-up speed and the like were adjusted such that the average of the thickness of the coating film directly above the substrate base portion was about 0.1 μm.

In Example 4, the defocus power was 4.09 D, and the stray light ratio was 2.7%.

In Example 5, the defocus power was 4.09 D, and the stray light ratio was 2.8%.

In Examples 4 and 5 as well, the defocus power was also further improved and the stray light ratio was also further reduced, compared to a case where the coating film was formed on the minute convex portions described in Patent Document 1 using the conventional spin coating method. It is inferred that this is because convex portions and concave portions were present on the outermost surface of the eyeglass lens, and the shape of the coating film convex portions was extremely approximated to the shape of substrate protruding portions directly below the coating film convex portions in the surrounding regions of the substrate protruding portions, even when properties of the coating film liquid were changed or the thickness of the coating film was varied.

The invention claimed is:

1. A method for manufacturing an eyeglass lens, capable of suppressing progression of near-sightedness, that includes a lens substrate having a plurality of substrate protruding portions that protrude from a substrate base portion on a surface of the lens substrate and a coating film provided so as to cover the plurality of substrate protruding portions, the outermost surface of the eyeglass lens having a plurality of convex portions and concave portions, the method comprising when, setting the lens substrate to the vertical direction or in a state where the lens substrate is inclined relative to the up-down direction in the horizontal direction, and forming the coating film by immersing the lens substrate in a coating film liquid and pulling up the lens substrate, and drying the coating film liquid on the lens substrate while or after the coating film liquid flows under its own weight, speed at which the curable composition being the coating film liquid is pulled up when the lens substrate is immersed, is set in a range of 10 to 400 mm/min, the substrate base portion and a coating film base portion constituted by forming the coating film on the substrate base portion have a shape that realizes a power of the wearer's prescription, the height of a substrate protruding portion is set in a range of 0.7 to 0.9 μm, the film thickness of the coating film is set in a range of 0.1 to 100 μm, a value obtained by dividing the smallest value of the thickness of a coating film extending over surrounding regions of substrate protruding portions by the largest value of the thickness of the coating film (the smallest value/the largest value) is set in a range of 1/1.5 to 1/10.

2. The method for manufacturing an eyeglass lens according to claim 1, an effect of suppressing progression of near-sightedness is exhibited by entering rays from the object-side surface of the eyeglass lens, emitting from the eyeball-side surface, and converging rays a predetermined position A in the base portion being other than the coating film convex portion on the outermost surface of the eyeglass lens, entering rays from the object-side surface of the eyeglass lens, emitting from the eyeball-side surface, and converging rays a position B that is closer to the object compared to the position A in the coating film convex portion on the outermost surface of the eyeglass lens, in the eyeglass lens, when a rate of stray light rays that do not pass through the vicinity of the predetermined position A, and also do not pass through the vicinity of the position B that is closer to the object compared to the position A, is set as stray light rate, the stray light ratio is set to 15% or less, the stray light rate is obtained as below:

measuring the surface shape of the eyeglass lens, generating a curved surface data of the convex surface of the eyeglass lens from the obtained surface shape, setting a model of the eyeglass lens based on the curved surface data, specifying the position A being a position where rays are most converged when rays pass through the eyeglass lens, the vicinity of the position A, the position B and the vicinity of the position B, by ray tracing calculation, based on the model, the inner side of a radius of 0.1 mm from the convergence position A refers to the vicinity of the position A, the inner side of a radius of 0.1 mm from the convergence position B refers to the vicinity of the position B.

* * * * *